Figure 1:
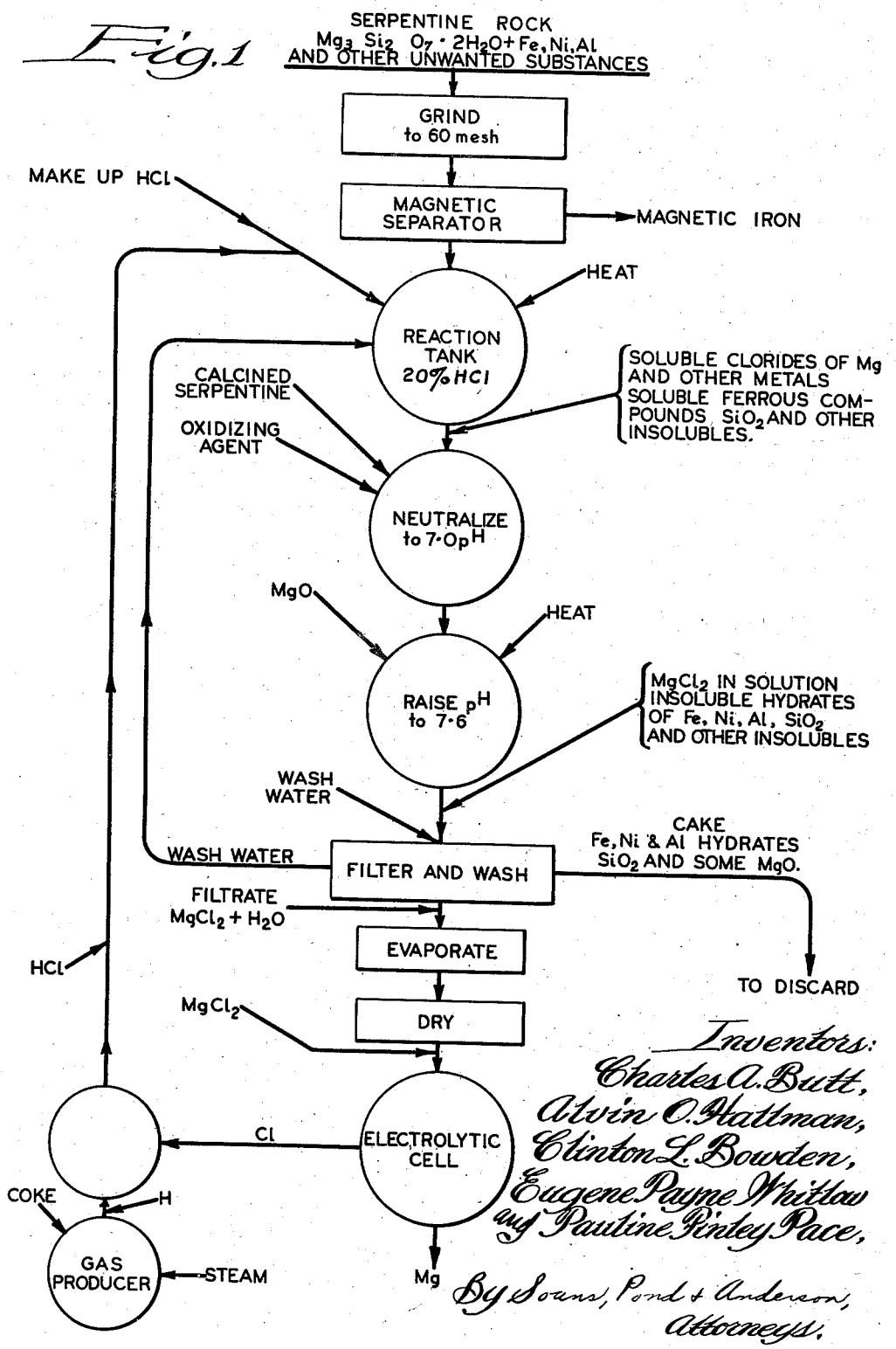

April 16, 1946.   C. A. BUTT ET AL   2,398,493
PRODUCTION OF MAGNESIUM CHLORIDE FROM SERPENTINE
Filed Feb. 4, 1944   2 Sheets-Sheet 1

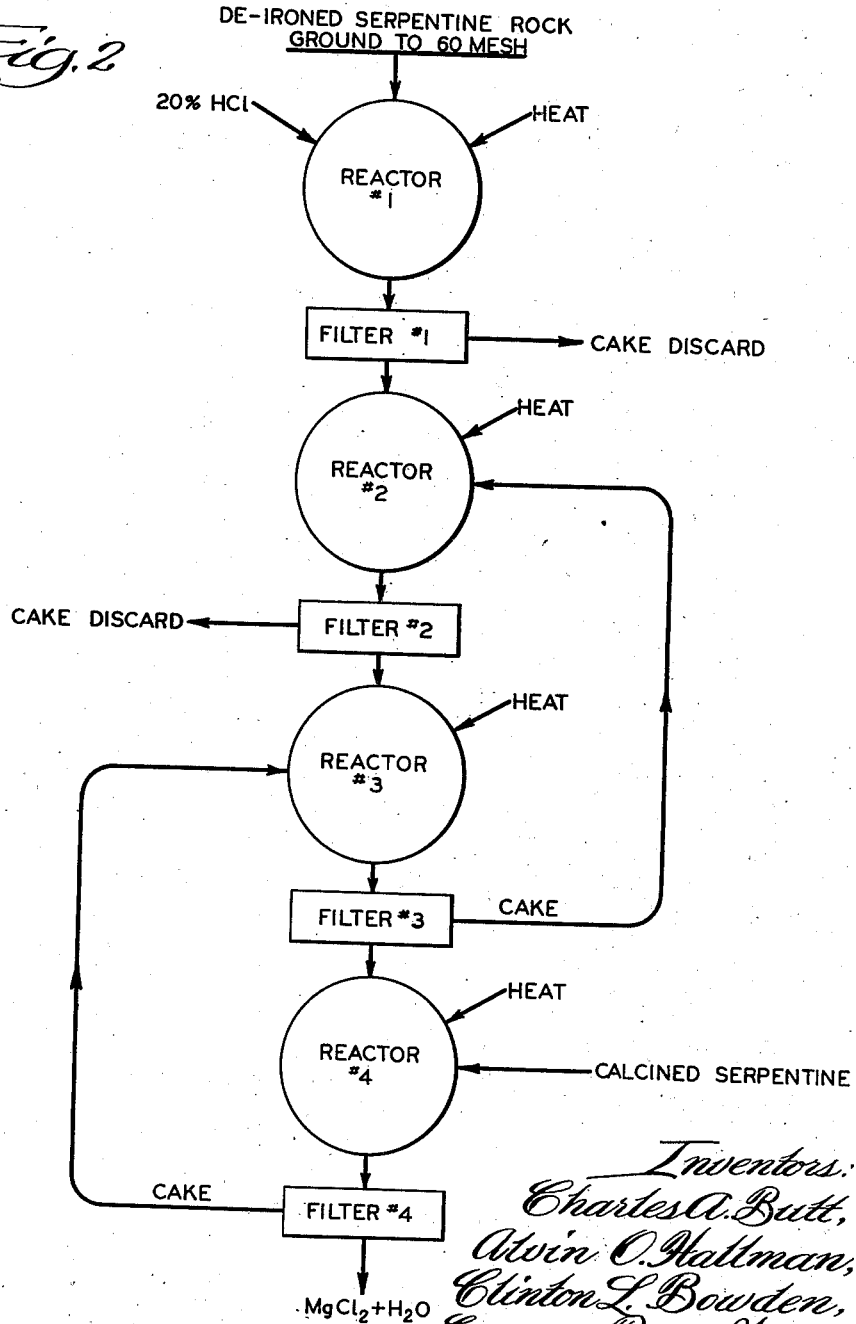

Patented Apr. 16, 1946

2,398,493

UNITED STATES PATENT OFFICE 2,398,493

PRODUCTION OF MAGNESIUM CHLORIDE FROM SERPENTINE

Charles A. Butt, East Point, Alvin O. Hallman, Augusta, and Clinton L. Bowden, East Point, Ga., and Eugene P. Whitlow and Pauline Finley Pace, Austin, Tex., assignors to International Minerals & Chemical Corporation, a corporation of New York Application February 4, 1944, Serial No. 521,032

7 Claims. (Cl. 204—70)

This invention relates to improvements in the production of magnesium chloride from natural rock known as serpentine. At the present time magnesium chloride is the principal raw material used in the production of magnesium metal by the electrolytic cell method.

The object of the invention is to provide an efficient process of the character described, whereby magnesium chloride can be produced in a relatively pure state suitable for treatment in the electrolytic cells, by a process which involves the use of relatively cheap materials which are readily available and by the use of manufacturing equipment of more or less conventional type.

It is also an object of the invention to obtain a relatively high yield on the basis of the raw materials used, and incidentally to produce by-products which are of value in the process itself or in the manufacture of other commodities.

The drawings accompanying this application illustrate diagrammatically two methods or processes for carrying out the principles of the invention. Fig. 1 of the drawings is a flow sheet illustrating the invention in a somewhat simple form, and Fig. 2 is a similar flow sheet showing a process utilizing the so-called counterflow method.

Heretofore the separation of magnesium from the silica and other impurities in serpentine rocks has been considered chemically possible but not economically feasible, due mainly to mechanical difficulties in the removal of the silica residue. Furthermore, natural serpentine, as is usual in the case of most natural products, is never produced in a chemically pure condition in the form of $Mg_3Si_2O_7 \cdot 2H_2O$, which is the accepted formula for such chemically pure material. In addition to impurities which creep in during the mining operation, the rock itself usually carries very material percentages of iron, nickel, aluminum and other materials which are either undesired or which would be positively deleterious as impurities in the final product $MgCl_2$ as the source for magnesium metal to be produced by the electrolytic cell method. The present process not only effects separation of the silica completely and economically, but in certain of its modifications permits separate recovery of the magnesium, the silica, and the other impurities.

The following is a typical analysis of raw serpentine rock as mined in Blanco and Gillespie Counties, in the State of Texas:

| | Per cent |
|---|---|
| $SiO_2$ | 40.31 |
| $Al_2O_3$ | 0.43 |
| $Fe_2O_3$ | 6.71 |
| $FeO$ | 0.7 |
| $MgO$ | 37.63 |
| $CaO$ | 0.05 |
| $Na_2O$ | 0.01 |
| $K_2O$ | 0.00 |
| $H_2O+\begin{Bmatrix}12.32\\0.92\end{Bmatrix}$ | 13.24 |
| $CO_2$ | 0.06 |
| $TiO_2$ | 0.01 |
| $P_2O_5$ | 0.01 |
| $F$ | 0.01 |
| $S$ | 0.03 |
| $Cr_2O_3$ | 0.41 |
| $MnO$ | 0.04 |
| $BaO$ | 0.00 |
| $NiO$ | 0.30 |
| | 99.95 |

Iron, aluminum, chromium and nickel, are particularly obnoxious as impurities in the final $MgCl_2$ product, and if possible every trace of them should be eliminated.

General method

According to our invention, the serpentine rock is preferably first comminuted by grinding so that no particles will be much, if any, larger than will pass through a screen 60 meshes to the inch. Then the ground up material may be processed in a magnetic separator, which is found to remove nearly all of the magnetic iron, which in some cases may be as much as one-half of the total iron content of the raw material. This preliminary removal of magnetic iron is of advantage not only because the magnetic iron is rather difficult to remove by chemical processes but the elimination of as much impurity as possible at an initial stage of the process serves to reduce the load upon the facilities employed in performing the later steps of the process. However, the magnetic iron oxide can be permitted to pass thru the process unaltered and be removed from the silica residue later if desired.

After the de-ironed material has left the magnetic separator, it is introduced into a reaction tank where it is treated with an aqueous medium containing 20% HCl. Preferably sufficient heat is applied to raise the temperature to the neighborhood of the boiling point of water. This treatment serves to convert the magnesium, the iron, the aluminum and nickel into soluble chlorides which go into solution.

If desired at this stage, the batch may be filtered in order to remove silica and other insolubles. However, in one type of process this filtration step need not be performed at this particular stage. The next step of the process consists in treating the batch, with or without the insolubles, with a basic material for the purpose of converting the soluble iron, nickel and aluminum chlorides into compounds such as hydrates which are insoluble and hence can be separated mechanically by a filtering step, while at the same time the magnesium chloride is kept in solution. Preferably, the material used for this reaction is or contains magnesium oxide, so that as an incident to the reaction, an additional amount of magnesium chloride will be formed in the solution, thereby increasing the yield and efficiency of the process.

This magnesium oxide used in the precipitation stage just described may be a magnesium hydroxide such as is obtained from sea water or from magnesite or dolomite, or by calcining raw serpentine rock. In the case of the serpentine rock here referred to, calcination may be effected in a muffle or a rotary kiln at a temperature of about 650° C. continued for a period of about five hours. Calcination serves to activate the MgO so that it will serve as a reagent for readily converting the Fe, Ni and Al chlorides into insoluble hydrates. During the calcination of the raw serpentine there appears to be no loss of any valuable ingredients, the only material given off being about 10 to 15 per cent of water, presumably water of crystallization.

It may be stated that it is advisable in some cases in order to effect proper elimination of the iron, to convert into ferric form any iron which may be present as a ferrous compound. To this end at about the neutral point, hydrogen peroxide, chlorine, or other suitable oxidizing agent may be added, after which it is advisable to add enough MgO to raise the pH to a point somewhat in excess of neutral, for example, to about 7.6.

The next stage of the process involves a mechanical separation of MgCl₂ solution from the insolubles. This can be effected in any desired type of filtering equipment. The clear solution, which contains from 20 to 25 per cent of MgCl₂, is then evaporated and dried and the solid dry material is then ready for charging into the electrolytic cells where it is converted into magnesium metal.

It is of considerable advantage to carry out this process as a part of a combined operation for producing magnesium metal from natural materials containing magnesium, because in the operation of the electrolytic cells chlorine is produced as a by-product. This by-product, chlorine, coming from the electrolytic cells, is combined with hydrogen obtained in a gas producer of the usual type involving injection of steam into incandescent coke, and the hydrochloric acid gas thus formed is used in making up the 20% hydrochloric acid employed in the first reaction step of the process. Thus this cell chlorine is not wasted, and the only additional amount of hydrochloric acid which is required is the relatively small amount required to supply deficiencies due to losses in the combined operation.

*Example No. I—(See Fig. 1)*

2,000 lbs. of serpentine rock from the Blanco and Gillespie County field in the State of Texas, containing about 740 lbs. of MgO, is passed through a Wetherill type magnetic separator, and about 40% of the magnetic iron is eliminated. The material is then charged into a reaction tank and treated with 7,000 lbs. of 20% hydrochloric acid. The temperature of the batch is raised to about 50° C. and agitated for about an hour, during which time the heat of the reaction increases the temperature to 80° C., after which additional heat is also applied to raise the temperature to about 95°–100° C.

Meanwhile some of the raw serpentine rock ground to 60 mesh has been calcined by heating it to a temperature of 675° C. or more in a rotary kiln, for at least 1 hour. This has served to drive off the water of crystallization and to activate the MgO content of the material.

200 lbs. or a sufficient amount of this calcined or activated serpentine is then added to the batch with continued agitation until the pH has been raised to the neutral point 7.0 at which time 20 lbs. of 15% hydrogen peroxide is added to the batch in order to oxidize to a ferric condition any of the ferrous iron which is present.

The next step is the addition of 50 lbs. of relatively pure MgO, or a sufficient amount to raise the pH to 7.6, meanwhile maintaining the temperature at 100° C. with constant agitation. The MgO may be added in the form of the hydrate such as is produced from sea water.

At this point, the batch consists of an aqueous solution of magnesium chloride (MgCl₂) containing in solid form a mechanical suspension of silica or silicates, the hydrates of iron, nickel and aluminum, and other insolubles.

The next stage is a filtering step in which the insolubles above referred to are separated from the MgCl₂ solution. The filter is then washed with clear water, and the wash water containing a small amount of MgCl₂ is salvaged by returning it to the reaction tank. The filter cake contains the silica or silicates, the metal hydrates, and other insolubles including about 10% of the original MgO content of the rock, the calcined rock, and the MgO used, which is all that is lost in the process. The filtrate contains 1818 lbs. of MgCl₂ representing 770 lbs. of MgO, the concentration being represented by 24.8 Bé. at 57° F., which is equivalent to 22.75% of MgCl₂.

The filtrate or solution of MgCl₂ is then evaporated to remove about ⅔ of the water and thereby produce a solution containing approximately 50% MgCl₂. This concentrated solution may then be dried in any conventional type of spray-drying equipment after which the powdered material may be briquetted and is then ready to be charged into the electrolytic cells.

As has been previously stated, the chlorine which is produced by the electrolytic cells is collected and saved and may be combined with hydrogen made in a conventional coke-steam gas-producer. The hydrochloric gas thus obtained is used for the purpose of making up the 20% HCl solution which is employed in the first reaction step of the process. The MgCl₂ process above described as practically 100% efficient in respect of consumption of HCl, and hence practically the only loss of HCl is that which occurs due to loss in the salvage of the chlorine produced by the electrolytic operation.

*Example No. II—(See Fig. 2)*

This is a modification of certain steps in the process represented by Example No. I. In this Example No. II, a more efficient operation in some respects may be obtained by dividing the neutralizing or precipitating step into a plurality of stages, a filtration step being interposed between separate neutralizing stages, and by utilizing the counter-flow or counter-current method of operation.

In one run, according to this modified process, 2,000 lbs. of serpentine rock was ground so that 95% passed through a 60 mesh screen and was then de-ironed and reacted with 6,800 lbs. of 20% HCl at 54° C. with gentle stirring. The reaction quickly raises the temperature to about 100–110° C. After about fifteen minutes, when the reaction is complete, the batch is immediately filtered so as to remove any insoluble materials such as silica, silicates etc. The cake also contains about 100 lbs. of MgO. The filtrate contains $MgCl_2$, $FeCl_3$, $NiCl_2$ and $AlCl_3$.

To insure the most efficient filtration, the above conditions should be accurately standardized and controlled. The figures stated are very satisfactory for Gillespie serpentine of normal good grade. With the proper care, the filtration rate is quite rapid, and the insoluble silica residue is finely divided and very reactive. It may be dissolved directly in an aqueous caustic soda solution to form a solution of sodium silicate.

This solution of chlorides is then fed into reactor 2, and at this point there is added the cake which is obtained from filter 3 later in the process. This cake obtained from filter 3 contains a substantial amount of active MgO, which reacts with the chlorides of aluminum, nickel, and iron, to form more $MgCl_2$ and the hydrates of the other metals, which hydrates are precipitated.

The batch from the reactor 2 is then passed through filter 2, and the cake containing most of the precipitated hydrates of iron, nickel and aluminum, as well as the silica added in the cake from filter 3, is discarded, or may be used for the recovery of by-products.

The filtrate from filter 2, which contains a rather small amount of iron and nickel is then charged into reactor 3. Meanwhile, the temperature is maintained at about 100° C. or slightly less, with constant stirring, and into this reactor 3 there is charged the cake from the final filter 4. In this reactor 3, nearly all of the remaining iron and nickel is precipitated. The batch from reactor 3 is then put through filter 3, and the cake resulting therefrom is used in reactor 2 as has previously been explained.

The filtrate from filter 3, which contains practically pure $MgCl_2$ with a very slight trace of iron and nickel in solution, is then treated at the same temperature, nearly 100° C., with constant stirring, with 400 lbs. of activated serpentine. This is prepared by crushing the rock to about −1″ to +⅜″, then calcining it in a rotary kiln for 5 hours at 650° C. and then grinding the calcined material so that 95% will pass through a 60 mesh screen.

This calcined serpentine containing highly reactive MgO serves to precipitate any final traces of iron and nickel, and such precipitates are removed by passing the batch through filter 4. The filtrate from this filter 4 contains a virtually pure $MgCl_2$ solution having a concentration of about 23%. The cake from this filter is used in the reactor 3, as has previously been described.

We claim:

1. Process for making $MgCl_2$ from serpentine, which consists in reacting natural serpentine rock with hydrochloric acid to form an aqueous solution of chlorides of magnesium and other metals present in the rock, reacting the batch with a material containing MgO so as to form $MgCl_2$ and insoluble compounds of metals other than magnesium, and then mechanically separating the $MgCl_2$ solution from the insolubles.

2. The improved process for making $MgCl_2$ from serpentine rock containing as impurities small percentages of other metals, which consists in first comminuting the natural rock, then reacting the comminuted rock at an elevated temperature with hydrochloric acid to form an aqueous solution of chlorides of magnesium and said other metals, then reacting the batch with a material containing MgO so as to form in the solution of $MgCl_2$ a precipitate of insoluble compounds of said other metals, then filtering the solution, then evaporating the filtrate to form concentrated $MgCl_2$.

3. Process for making $MgCl_2$ and magnesium from serpentine, which consists in reacting natural serpentine rock with hydrochloric acid to form an aqueous solution of chlorides of magnesium and other metals present in the rock, reacting the batch with a material containing MgO so as to form $MgCl_2$ and insoluble compounds of metals other than magnesium, then mechanically separating the $MgCl_2$ solution from the insolubles, then evaporating the water from the solution to form a relatively dry solid $MgCl_2$, then electrolyzing the dry $MgCl_2$ to form magnesium metal and chlorine gas, then combining said chlorine with hydrogen to form hydrochloric acid gas, and then utilizing the said hydrochloric acid gas to make hydrochloric acid for use in the first step of the process.

4. The improved process for making $MgCl_2$ from serpentine containing other metals in addition to magnesium, which consists in first comminuting the natural serpentine rock, then reacting the comminuted rock with hydrochloric acid to form an aqueous solution of chlorides of magnesium and said other metals, and then reacting the solution with serpentine rock which has been calcined so as to activate the MgO content of the rock, thereby forming additional $MgCl_2$ and also insoluble oxygen-containing compounds of said other metals, then mechanically separating the $MgCl_2$ solution from the insolubles.

5. The improved process for making $MgCl_2$ from natural serpentine rock, which consists in first comminuting the natural rock, then reacting the comminuted rock with hydrochloric acid at a temperature between 50° C. and 100° C. to form an aqueous solution of chlorides of magnesium and other metals present in the rock as impurities, then reacting the solution with sufficient material containing magnesium oxide at a temperature between 50° C. and 100° C. to raise the pH to between 7.0 and 7.6 and thereby form insolubilized oxides of said other metals, and then mechanically separating the $MgCl_2$ solution from the insolubles.

6. The improved process of making relatively pure magnesium chloride from natural serpentine rock which contains as impurities metals such as iron, nickel and aluminum, which consists in first comminuting the natural serpentine rock, then reacting the comminuted rock with hydrochloric acid to form an aqueous solution of the chlorides of magnesium and said other metals, then removing the insoluble materials by filtration, then converting a portion of the soluble chlorides of such other metals into insoluble hydrates by reacting the solution with a material containing insufficient active MgO to react with all of said unwanted chlorides, said material being the insoluble material resulting from filtering the batch in a subsequent stage of the process, then filtering out the insolubles including said precipitated metallic compounds, then again reacting the resulting filtrate with a material containing more than sufficient active MgO to precipitate substantially the entire remainder of the said unwanted metals in solution, then filtering the batch to produce a substantially pure aqueous solution of magnesium chloride and a solid containing a reduced amount of active MgO, and utilizing said last-mentioned solid material as the precipitant in the first-mentioned precipitation stage.

7. The method of decomposing serpentine rock with hydrochloric acid which comprises exposing the comminuted rock to the action of hot hydrochloric acid in about 20% concentration for about 15 minutes and promptly filtering the precipitate; whereby a highly reactive precipitate of silica is obtained which dissolves readily in aqueous caustic soda.

CHARLES A. BUTT.
ALVIN O. HALLMAN.
CLINTON L. BOWDEN.
EUGENE P. WHITLOW.
PAULINE FINLEY PACE.